US006392849B2

(12) United States Patent
Maruyama et al.

(10) Patent No.: US 6,392,849 B2
(45) Date of Patent: May 21, 2002

(54) MAGNETIC HEAD WITH DUAL SPIN VALVE ELEMENT FOR DIFFERENTIAL OPERATION (75) Inventors: Yoji Maruyama, Iruma; Yoshio Suzuki, Suginami-ku; Ryoichi Nakatani, Akiruno; Hisashi Takano, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/789,670

(22) Filed: Feb. 22, 2001

Related U.S. Application Data (63) Continuation of application No. 09/065,868, filed on Apr. 24, 1998.

(30) Foreign Application Priority Data

Apr. 25, 1997 (JP) .............................. 9-108564
May 29, 1997 (JP) .............................. 9-139651

(51) Int. Cl.$^7$ ................................. G11B 5/39
(52) U.S. Cl. ....................................... 360/314
(58) Field of Search ......................... 360/314

(56) References Cited

U.S. PATENT DOCUMENTS

| 5,329,413 | A | * | 7/1994 | Kondoh et al. | 360/113 |
| 5,627,703 | A | * | 5/1997 | Smith | 360/113 |
| 5,701,222 | A | * | 12/1997 | Gill et al. | 360/314 |
| 5,748,424 | A | * | 5/1998 | Gill | 360/66 |
| 5,751,521 | A | * | 5/1998 | Gill | 360/113 |
| 5,768,066 | A | * | 6/1998 | Akiyama et al. | 360/113 |
| 5,768,069 | A | * | 6/1998 | Mauri | 360/113 |
| 5,856,897 | A | * | 1/1999 | Mauri | 360/113 |
| 5,936,810 | A | * | 8/1999 | Nakamoto et al. | 360/113 |
| 6,038,107 | A | * | 3/2000 | Pinarbasi | 360/324.11 |
| 6,185,079 | B1 | * | 2/2001 | Gill | 360/324.2 |

OTHER PUBLICATIONS

Digests of Intermag, 1996 AA–04.
H. Neal Bertram, "Theory of Magnetic Recording", p. 194–199.
IEEE Trans. On Magnetics, "Gbit/in Perpendicular Recording Using Double Layer Medium and MIG", IEEE Trans. on Magnetics "Gbit/in Perpendicular Recording Using Double Layer Medium and MIG".
"Head", Iwasaki et al., vol. 32, No. 5, Sep. 1996, pp. 3795–3800.

* cited by examiner

Primary Examiner—David Hudspeth
Assistant Examiner—Angel Castro
(74) Attorney, Agent, or Firm—Kenyon & Kenyon

(57) ABSTRACT

It is the object of the invention to provide a magnetic head and a magnetic storage apparatus using the magnetic head provided with a signal reproducing means which is capable of using the same signal processing circuit as used for the conventional longitudinal magnetization film type recording medium even when a perpendicular magnetization film type recording medium is used. Because the present invention renders the reproducing signal generated from a perpendicular magnetization film Gaussian shaped (Lorentizian pulse), the same signal processing circuit as used for the conventional longitudinal magnetization film type recording medium can be used. To accomplish this object, in the reproducing means which is the component of the information reproducing component of the magnetic head, the first spin valve element and the second valve element are piled up, the magnetization direction of pinned layers of both elements is prescribed so as to be antiparallel each other, and lead electrodes of both elements are connected so as to be common.

14 Claims, 8 Drawing Sheets

AIR BEARING SURFACE

MAGNETIC HEAD WITH DUAL SPIN VALVE ELEMENT FOR DIFFERENTIAL OPERATION

This application is a continuation of application Ser. No. 09/065,868, filed Apr. 24, 1998, the entire disclosure of which is incorporated by reference.

BACKGROUND OF THE INVENTION

1. Field of the Invention

This invention relates to a magnetic storage apparatus used for computers and information processing apparatuses, and more particularly relates to a magnetic head and a magnetic storage apparatus suitable for a perpendicular magnetic recording medium obtained realizing a high density recording.

2. Description of the Prior Art

Information processing apparatus employs mainly semiconductor memory and magnetic memory as their storage apparatus. Semiconductor memory is used mainly for the internal storage apparatus in view of access time, and magnetic memory is used mainly for external storage apparatus in view of large capacity and non-volatility.

Recently, magnetic disk and magnetic tape have been mainly used as magnetic memory. A recording medium used for these magnetic memory comprises an Al substrate or resin tape on which a magnetic thin film is formed. To record magnetic information on the recording medium, a functional component having electromagnetic conversion function is used. To reproduce magnetic information, a functional component which utilizes magnetoresistive phenomenon, giant magnetoresistive phenomenon, or electromagnetic induction phenomenon is used. The functional component is incorporated in an input/output unit so-called a magnetic head.

A magnetic head and a recording medium are moved relatively, and have a function to record magnetic information on the arbitrary position of the medium and to reproduce electrically magnetic information as required.

Figure 2:
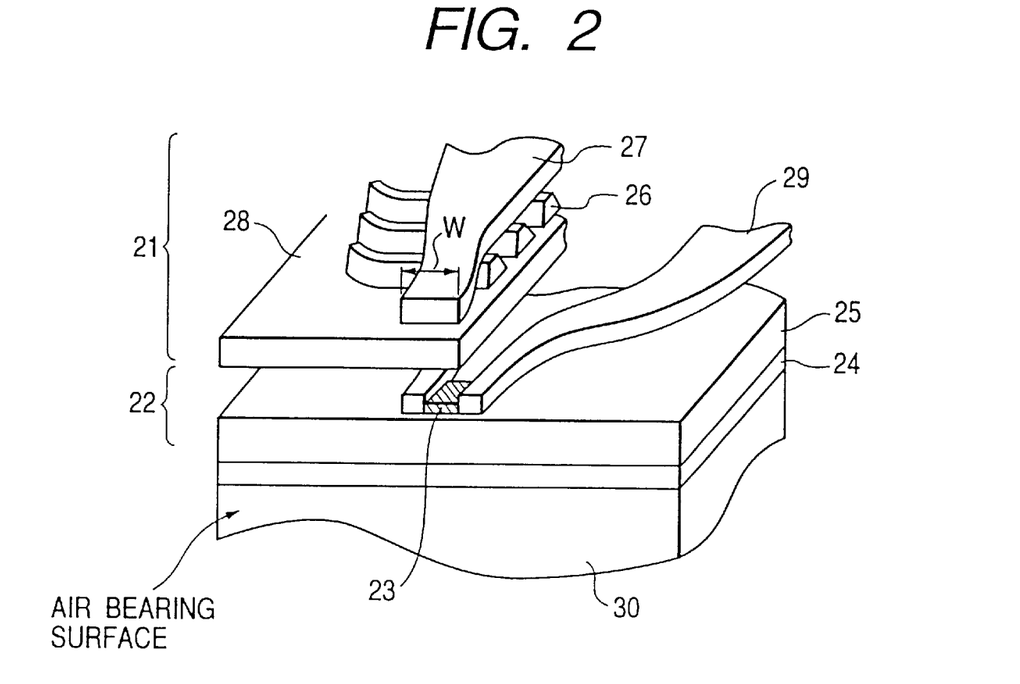
FIG. 2 is a perspective view for illustrating a reproducing component 21 and recording component 22 of a conventional magnetic head.

As shown in FIG. 2, a magnetic head comprises, for example, a recording component 21 for recording magnetic information and a reproducing component 22 for reproducing magnetic information.

The recording component 21 comprises a coil 26 and magnetically coupled magnetic poles 27 and 28 located so that the coil 26 is sandwiched therebetween.

The reproducing component 22 comprises a magnetoresistive effect unit 23 and an electrode 29 for supplying a constant current to the magnetoresistive effect unit 23 and for detecting resistance change.

Between the recording component 21 and the reproducing component 22, a magnetic shield layer 28 (served also as the write pole) is provided. These functional components are formed on a magnetic head body 30 through a primary layer.

The example shown in FIG. 2 utilizes electromagnetic conversion function for recording and utilizes magnetoresistive effect for reproducing. However, the reproduction of magnetic information may be performed by detecting electromagnetic induction current induced in a coil provided in a recording component. In this case one component is served for both recording and reproducing.

The performance of a storage apparatus depends on the input/output operation speed and storage capacity, as a result, short access time and large storage capacity are essential to render the product competitive. Recently small sized storage apparatus have been developed in response to the request for compact information apparatus. To satisfy this request, development of a magnetic memory device for recording and reproducing much magnetic information in and from a single sheet of recording medium is important.

To satisfy this request, it is required to increase the recording density of a magnetic memory device. To increase the recording density, it is required to miniaturize the size of domain which is the source of magnetic information. It is required to increase the frequency of recording current supplied to the coil 26 shown in FIG. 2 and to design the width W of recording magnetic pole 27 narrow.

According to the examination of the inventors, a condition that a recording pole width W of 2.5 $\mu$m and a recording frequency of about 90 MHz realized a recording density of 2 Gb/in$^2$ class. However, it was found that more increased density caused a problem and revealed the limitation of high density recording.

Heretofore, magnetic films called as longitudinal media of in-plane magnetization direction have been used as recording media. In an in-plane medium, boundary between domains is mainly magnetized, the magnetization is read out by detecting field intensity. Because the magnetization is concentrated, a signal of Gaussian shape (Lorentzian shape) pulse signal is outputted. Since frequency band contained in a signal is narrow, it is less susceptible to the deterioration of signal quality due to neighboring signal. Therefore, signals are processed easily thereafter.

However, thermal fluctuation of magnetization is inevitable problem in development of high density recording using an in-plane medium. The thermal fluctuation is due to thermal fluctuation of magnetization in a recording medium, and the thermal fluctuation is caused with increasing miniaturization of domain because the demagnetizing effect of neighboring domain becomes remarkable and magnetization direction becomes unstable.

According to experiments conducted by the inventors, it was confirmed that domain could be erased due to thermal fluctuation when density was increased as high as to about 400 kbPI (bits per inch) in the circular direction and about 26 kTPI (tracks per inch) in the radius direction.

The perpendicular magnetic recording is known as a technology for preventing the problem. Because demagnetization of neighboring domain functions so that fluctuation width of magnetization due to thermal fluctuation is decreased, the domain erasing phenomenon due to thermal fluctuation is less susceptible. Therefore, the perpendicular magnetic recording is expected to be the high density recording technology of the future.

However, because magnetic charges are distributed on the medium surface in the perpendicular magnetic recording, if magnetization is reproduced using a reproducer used for detecting field intensity of a conventional longitudinal medium as shown in FIG. 2, square wave (dipulse) is detected depending on domain width. Such square wave requires complex signal processing because of wide band. Such complex signal processing requires use of a complex electric circuit. Therefore, it is difficult to realize an inexpensive and high speed apparatus, and as a result, this problem is one of the reasons of slow commercialization of the perpendicular magnetic recording.

SUMMARY OF THE INVENTION

The above-mentioned problem will be solved if output signals obtained from perpendicular media are of Gaussian shape similarly to conventional longitudinal media.

Accordingly, it is the object of the present invention to provide a magnetic head and a magnetic recording apparatus using the magnetic head having a novel reproducing means which is capable of outputting reproducing signal obtained from a perpendicular magnetic medium as Gaussian shape pulse signal. The present invention can realizes high speed and high density magnetic recording apparatus which utilizes perpendicular magnetic recording method.

In order to realize the above-mentioned object, the magnetic head and the magnetic recording apparatus using the magnetic head of the present invention use means described hereinafter.

The first means uses a perpendicular magnetization film having an easy magnetization axis perpendicular to the direction of the film surface, and the first means is provided with at least a magnetic head having a function for recording and reproducing information. Particularly in the magnetic head, a reproducing means for having reproducing function of information is provided with piled up two spin valve elements with a pinned layers having magnetization direction difference of about 180 degrees, and recorded information is reproduced from the perpendicular magnetization film.

In detail, the object of the present invention is accomplished by providing a magnetic recording apparatus provided with a perpendicular magnetic recording medium having an easy magnetization axis in the direction perpendicular to the longitudinal surface, and a magnetic head having both recording and reproducing function of information, wherein the magnetic head is structured with a reproducing means comprising piled two (the first and second) spin valve elements having at least a magnetoresistive elements for performing reproducing function, and the magnetization direction of pinned layers which are a components of each spin valve element is different by about 180 degrees each other.

Both ends of two (first and second) spin valve elements respectively provided with a magnetoresistive element is connected commonly and an electrode is provided to each terminal, and operation of read out (reproducing) means is performed by connecting a constant voltage power source or constant current power source to an electrode.

Preferably pinned layers of the piled two spin valve elements comprises respectively an antiferromagnetic film, and a blocking temperature difference of the respective antiferromagnetic films is prescribed to be 20° C. or larger. The blocking temperature will be described hereinafter.

Alternatively, pinned layers of the piled two spin valve element comprise a high coercive force film, and a coercive force difference of the respective high coercive force films is prescribed to be 100 Oe or lager.

A current terminal of the first spin valve element and a current terminal of the second spin valve element are connected commonly, and an electrode is provided on the common point. Thereby two elements function as a single device.

Alternatively, the first spin valve element and the second spin valve element are maintained electrically insulated, connected so that output from the elements is in differential mode, and supplied with a current.

In the above-mentioned case, a dual spin valve element having the first spin valve element and the second spin valve element provided with a single oxide antiferromagnetic film inserted therebetween is structured.

The above-mentioned reproducing means is incorporated in a magnetic head slider, and provided partially on an air bearing surface at least near a perpendicular magnetic recording medium.

In the above-mentioned reproducing means, the respective spin valve elements are piled up closely, and a soft magnetic pattern is provided between these spin valve elements on the side distant from the air bearing surface. The soft magnetic pattern forms a magnetic circuit from the first spin valve element to the second spin valve element.

The second means to accomplish the above-mentioned object is a magnetic recording apparatus comprising a perpendicular magnetic recording medium having an easy magnetization axis in the direction perpendicular to the film surface and a magnetic head having both functions for recording and reproducing information. The reproducing function of the magnetic head is given by a reproducing means provided with the first spin valve element and the second spin valve element piled up with interposition of a spacer film which spin valve elements at least comprise a magnetoresistive element, the first spin valve element comprises the first ferromagnetic film, the first non-magnetic medium layer, the second ferromagnetic film, the second non-magnetic film, and third ferromagnetic film placed one on another in this order or in inverse order, and functions thereby so that the first ferromagnetic film and the second ferromagnetic film exert exchange interaction each other so as to direct the magnetization direction of the respective ferromagnetic films in inverse direction, and the difference in magnetization direction between the second ferromagnetic layer and the third ferromagnetic layer generates magnetoresistive effect. The second spin valve element comprises the fourth ferromagnetic film, the third non-magnetic medium layer, and fifth ferromagnetic film placed one on another in this order or in inverse order, and functions thereby so that the difference in magnetization direction between the fourth ferromagnetic film and the fifth ferromagnetic film generates magnetoresistive effect.

Both ends of two (first and second) spin valve elements respectively provided with a magnetoresistive element is connected commonly and an electrode is provided to each common point, and operation of read out (reproducing) means is performed by connecting a constant voltage power source or constant current power source to an electrode.

In the structure of the spin valve element, the first non-magnetic medium layer comprises a layer with a thickness of 1.5 nm or thinner consisting of any one of metal layers selected from a group of Ru, Rh, Ir, Cr, and Cu or consisting of an alloy containing some of these metals. The first non-magnetic medium layer is sandwiched between ferromagnetic layers to generate strong antiferromagnetic exchange interaction between these ferromagnetic layers. As a result, the magnetization direction of the first ferromagnetic layer and the magnetization direction of the second ferromagnetic layer are always in antiparallel relation each other.

The above-mentioned second non-magnetic medium and third non-magnetic medium layer comprise a Cu layer.

The product of the film thickness and saturation magnetization of the first ferromagnetic film is prescribed to be larger than the product of the film thickness and saturation magnetization of the second ferromagnetic film.

Further, a spacer film for separating the first spin valve element from the second spin valve element is sandwiched between the third ferromagnetic film and the fourth ferromagnetic film, and the third ferromagnetic film and the fourth ferromagnetic film are both comprise a soft magnetic film.

The magnetization of the first ferromagnetic film and the fifth ferromagnetic film are prescribed to be in the same direction.

The above-mentioned first ferromagnetic film and the fifth ferromagnetic film are structured so that the magnetization direction is specified by the antiferromagnetic film or hard magnetic film which is in contact with these ferromagnetic films respectively.

The third means to accomplish the above-mentioned object has a structure in which, for example, the first spin valve element having an Ru film provided between the first ferromagnetic film and the second ferromagnetic film, and having a Cu film provided between the second ferromagnetic film and the third ferromagnetic film, and the second spin valve element having a Cu film provided between the fourth ferromagnetic film and the fifth ferromagnetic film and having an Ru film provided between the fifth ferromagnetic film and the sixth ferromagnetic film are provided with interposition of a desired spacer film adjacently, the reproducing function component having the above-mentioned structure is used for reproducing information.

In detail, the third means is a magnetic recording apparatus provided with a perpendicular magnetic recording medium having an easy magnetization axis perpendicular to the film surface direction and a magnetic head having both functions for recording and reproducing information. The reproducing function of the magnetic head is given by a reproducing means provided with the first spin valve element and the second spin valve element piled up with interposition of a spacer film which spin valve elements at least comprise a magnetoresistive element. The first spin valve element has the first non-magnetic medium layer between the first ferromagnetic film and the second ferromagnetic film, and has the second non-magnetic medium layer between the second ferromagnetic film and the third ferromagnetic film, and the second spin valve element has the third non-magnetic medium layer between the fourth ferromagnetic film and the fifth ferromagnetic film, and has the fourth non-magnetic medium layer between the firth ferromagnetic film and the sixth ferromagnetic film.

An electrode is provided respectively on the both ends of the two spin valve elements, and operation of read out (reproducing) means is performed by connecting a constant voltage power source or constant current power source to an electrode.

Preferable structure is described herein under. The first non-magnetic medium layer and the fourth non-magnetic medium layer respectively comprise a layer consisting of any one of metal layers selected from a group of Ru, Rh, Ir, Cr, and Cu or consisting of an alloy containing some of these metals.

The above-mentioned second non-magnetic medium layer and third non-magnetic medium layer comprise respectively a Cu layer.

The film thickness of the first ferromagnetic film is prescribed to be thicker than the film thickness of the ferromagnetic film, and the film thickness of the fifth ferromagnetic film is prescribed to be thicker than the film thickness of the sixth ferromagnetic film.

A spacer film for separating the first spin valve element from the second spin valve element is provided between the third ferromagnetic film and the fourth ferromagnetic film, and the third ferromagnetic film and the fourth ferromagnetic film respectively comprise a soft magnetic film.

The magnetization direction of the first ferromagnetic film and the fifth ferromagnetic film are respectively structured so as to be directed in the same direction.

Further, the magnetization direction of the first ferromagnetic film and sixth ferromagnetic film is specified respectively by an antiferromagnetic film or hard magnetic film which are respectively in contact with these ferromagnetic films.

BRIEF DESCRIPTION OF THE DRAWING

FIG. 11A1 and FIG. 11A2 are diagrams for describing principle for changing pinned layer magnetization antiparallel of the spin valve element 34.

FIG. 11B1 and FIG. 11B2 are diagrams for describing principle for changing pinned layer magnetization antiparallel of the spin valve element 33.

DETAILED DESCRIPTION OF THE PREFERRED EMBODIMENTS

FIRST EXAMPLE

A typical structure of a reproducing component of a magnetic head to which a magnetic recording apparatus of the present invention will be described hereinafter with reference to FIG. 1A to FIG. 1D.

Figure 1A:
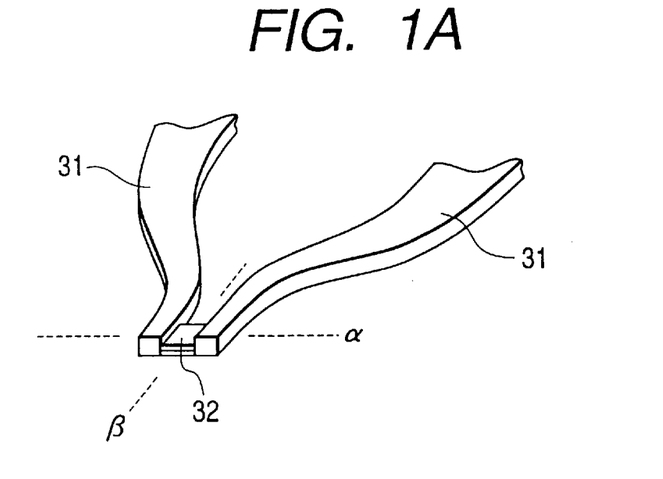
FIG. 1A is a perspective view for illustrating the structure of a reproducing means of one example of the present invention.

FIG. 1A is a schematic diagram of the reproducing component (corresponds to the reproducing component shown in FIG. 2). The reproducing component comprises a magnetoresistive element 32 and electrodes 31. In the present invention, a giant magnetoresistive element or conventional magnetoresistive element may be used as the magnetoresistive element 32. An example in which a giant magnetoresistive element is used is described in this example.

Figure 1B:
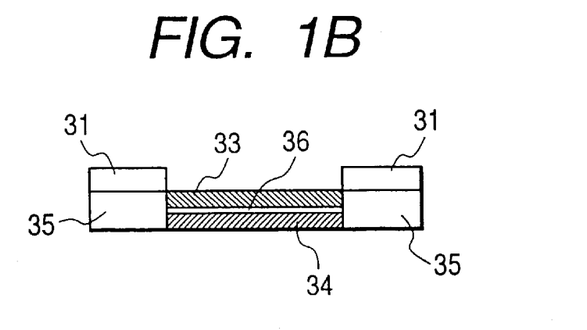
FIG. 1B is a sectional view of the reproducing means taken along the line α in FIG. 1A.
Figure 1C:
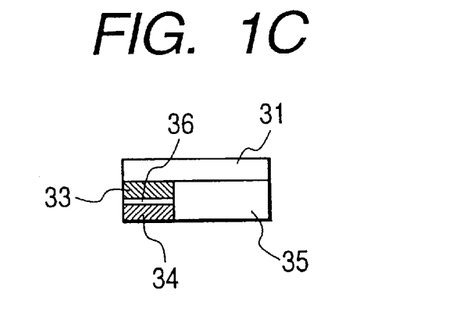
FIG. 1C is a sectional view of the reproducing means taken along the line β in FIG. 1A.

FIG. 1B shows a sectional structure taken along the line α in FIG. 1A, and FIG. 1C shows a sectional structure taken along the line β in FIG. 1A. As shown in FIG. 1B and FIG. 1C, the first giant magnetoresistive element 33 and the second giant magnetoresistive element 34 are piled up, and a non-magnetic film is provided between the giant magnetoresistive elements 33 and 34. Magnetic patterns 35 having high coercive force are provided on both ends of the giant magnetoresistive elements 33 and 34 to change the soft magnetic layer which is a component of the giant magnetoresistive element to a single domain and to arrange magnetization in the same direction.

The magnetization direction of the magnetic patterns 35 is in parallel to the line α like the conventional longitudinal medium. The electrodes 31 are located on the magnetic patterns 35, and structured so as to supply a current to two giant magnetoresistive elements 33 and 34 in the same direction.

In the structure described hereinbefore, the structure is novel in that two functional thin films 33 and 34 corresponding to giant magnetoresistive elements are piled up with interposition of the non-magnetic film 36 and in that common electrodes 31 are connected to these two functional thin films.

The electric resistance of each functional thin film changes depending on the field intensity (perpendicular field component; parallel field component to the line β shown in FIG. 1A) at the position where the functional thin film is located. The change is detected as the change of the voltage between both ends by supplying a constant current to the functional thin film. Alternatively, the change can be detected as the change of the current by supplying a constant voltage.

By using functional thin films located at positions distant spatially each other, the field intensity at the positions distant spatially each other can be measured simultaneously. Therefore, by detecting the field intensity difference as an output difference, the field gradient between the positions distant spatially each other can be measured.

First, to detect the field intensity difference at the positions distant spatially each other, two giant magnetoresistive elements are structured to have a spin valve element structure in this example. The detailed structure is described with reference to FIG. 1D.

Figure 1D:
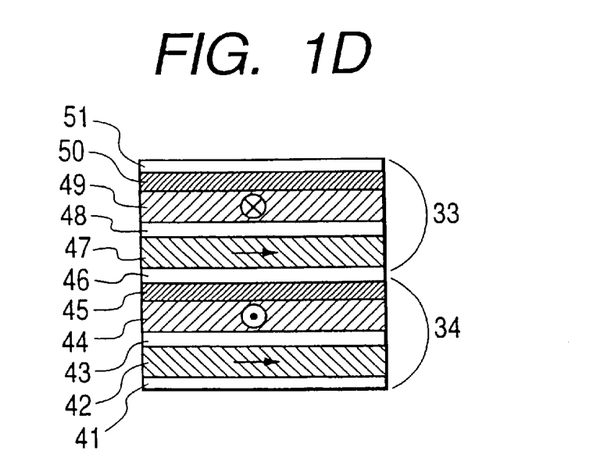
FIG. 1D is a sectional view for illustrating piling up of spin valve elements 33 and 34 taken along the line β in FIG. 1A.

An under layer film (Hf: 5 nm) 41 is deposited, and successively a soft magnetic film (free layer: NiFe: 6 nm) 42, a non-magnetic film (Cu: 3 nm) 43, a pinned layer (pinned layer: NiFe: 3 nm) 44, and an antiferromagnetic film (Fe-Mn: 10 nm) are deposited, and these films constitute the first spin valve element (giant magnetoresistive element or functional thin film in a broader sense of the term) 34.

Similarly, the second spin valve element 33 is also formed by depositing a under layer film (Hf: 5 nm) 46, a soft magnetic film (free layer: NiFe: 6 nm) 47, a non-magnetic layer (Cu: 3 nm) 48, a pinned layer (pinned layer: NiFe: 3 nm) 49, an anti-magnetic film (Fe-Mn: 10 nm) 50, and a protection layer (Hf: 5 nm) 51 successively.

To detect the field intensity difference using the above-mentioned structure, the magnetization direction of the pinned layer 44 which is a component of the first spin valve element 34 is differentiated angularly from the magnetization direction of the pinned layer 49 which is a component of the second spin valve element 33 by 180 degrees. To realize the difference, the blocking temperature of the antiferromagnetic films 45 and 50 which are components of two spin valve elements is differentiated each other by 20° C. or larger.

The magnetization direction of the pinned layers 44 and 49 can be prescribed to be parallel or antiparallel with respect to a prescribed axis (usually, in the direction parallel to the line β shown in FIG. 1A) by exchange interaction from the antiferromagnetic films 45 and 50. The parallel magnetization direction or antiparallel magnetization direction can be prescribed by applying an external field. The exchange interaction is dependent on the temperature, and demagnetized above a certain temperature. The temperature is called as blocking temperature.

As described herein above, the magnetization of a pinned layer can not be prescribed above the blocking temperature. Therefore, if the blocking temperature of the antiferromagnetic films 45 and 50 which are components of each spin valve element is different in the laminated spin valve elements 33 and 34, the magnetization of a pinned layer can be prescribed by controlling the temperature when an external field is applied.

The blocking temperature is different depending on antiferromagnetic material such as NiFe, NiMn, IrMn, and NiO, further, the blocking temperature of the same material is different depending on composition and deposition condition. The difference is controllable and it is easy to differentiate the blocking temperature by 20° C. or larger. The blocking temperature difference of 20° C. or larger allows easy pinned layer magnetization inversion of 180 degrees, that is, there is no problem in magnetize operation.

From the reason described herein above, it is understandable that the magnetization direction of the pinned layer 44 which is a component of the first spin valve element 34 and the pinned layer 49 which is a component of the second spin valve element 33 is changed by about 180 degrees each other (to antiparallel relation).

Next, the reason why the field intensity difference can be detected by changing the magnetization direction of the pinned layer 44 of the first spin valve element 34 and the pinned layer 49 of the second spin valve element 33 by about 180 degrees (to antiparallel relation) is described.

Figure 6A:
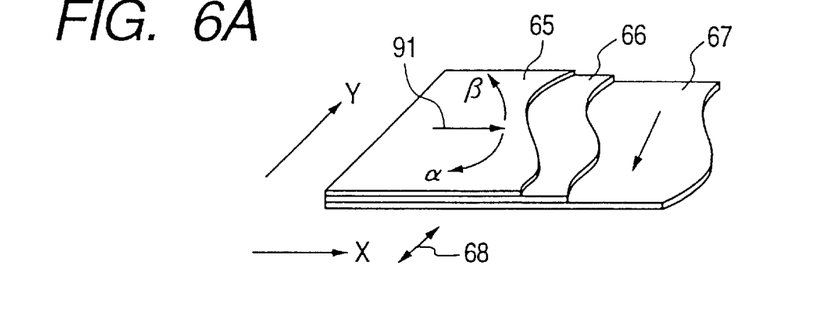
FIG. 6A, FIG. 6B, and FIG. 6C are schematic diagrams for describing operational principle of the present invention comprising piled up two spin valve elements 33 and 34.

FIG. 6A shows the magnetization state of a spin valve element (giant magnetoresistive element in a broader sense). The magnetization direction of the pinned layer 67 is antiparallel to Y-axis (perpendicular field direction). The medium layer 66 consists of a non-magnetic material (Cu). The soft magnetic layer (free layer) 65 having magnetization state parallel to X-axis is located on the medium layer 66. When a field (perpendicular field component: perpendicular to the plane of a recording medium) 68 is applied to this layer, the magnetization 91 is turned to a direction or P direction depending on the direction of the field. If the magnetization 91 turns in α direction, then it is oriented toward the direction parallel to the magnetization direction of the pinned layer 67. On the other hand, if the magnetization 91 turns in β direction, then it is oriented toward the direction antiparallel to the magnetization of the pinned layer 67. Based on the principle of the spin valve element, the parallel state gives a low electrical resistance and the antiparallel state gives a high electrical resistance.

Next, the sensitivity to a field gradient in the structure simply comprising two spin valve elements piled up one above the other as described herein above is examined.

Figure 6B:
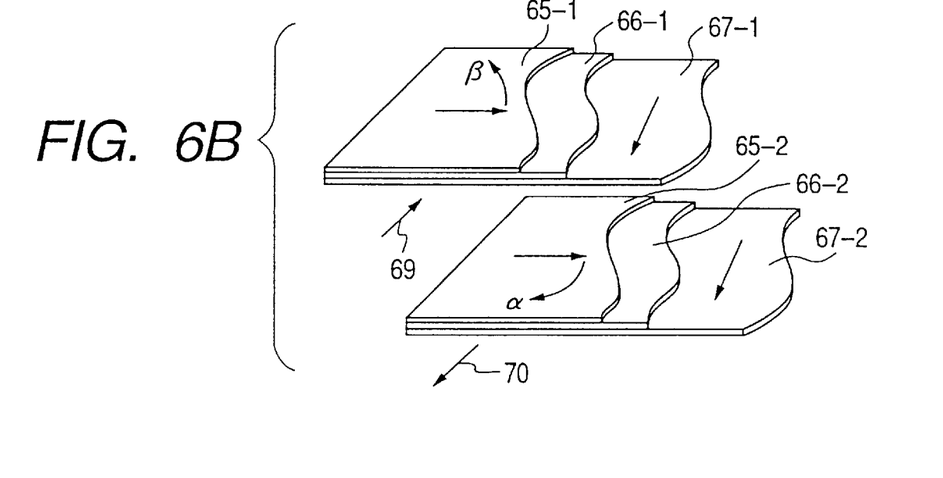

As shown in FIG. 6B, two spin valve elements having a medium layer 66-1 and medium layer 66-2 respectively are piled up one above the other (elements are shown schematically apart each other for the purpose of description in the drawing), and it is assumed that a field 69 is applied to the first element and a field 70 directing to the opposite direction is applied to the second element. As shown in the drawing, the magnetization of the soft magnetic layer 65-1 turns in β direction, and on the other hand, the magnetization of the soft magnetic layer 65-2 turns in α direction. The magnetization direction of the soft magnetic layer 65-1 is antiparallel to the magnetization direction of the pinned layer 67-1, and on other hand, the magnetization direction of the soft magnetic layer 65-2 is parallel to the magnetization direction of the pinned layer 67-2. Mere difference in polarity between the external field 69 and 70 only results in the difference in resistance between the elements, and the add resistance is not changed (precisely to say, the add resistance changes slightly due to quality dispersion of the element). In other words, the structure shown in FIG. 6B is not sensitive to the field gradient.

Figure 6C:
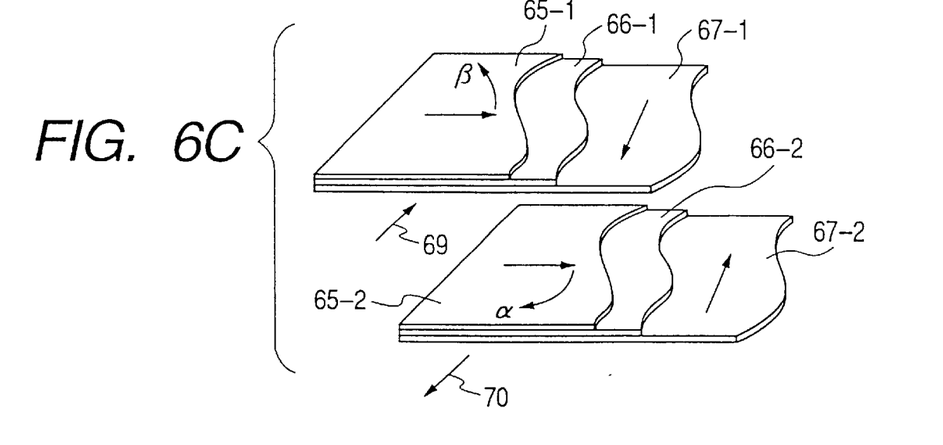

However, as shown in FIG. 6C, in the case of antiparallel magnetization direction of the pinned layer 67-1 and pinned layer 67-2, the field 69 is applied to the first element and an opposite field 70 is applied to the second element, then magnetization turns as described herein above, and thereby both becomes antiparallel (high resistance) to the magnetization direction of the pinned layers 67-1 and 67-2 respectively. As a result, the add resistance of two elements increases. On the other hand, in the case that the external field 69 and the external field 70 are both oppositely oriented, because the magnetization of the soft magnetic layer turns in the opposite direction, both resistance decreases.

However, if the field 69 and field 70 are both parallel, because the magnetization of the soft magnetic layers 65-1 and 65-2 both turns in the same direction, the magnetization direction of the soft magnetic layers 65-1 and 65-2 is antiparallel and parallel to the magnetization direction of the pinned layers 67-1 and 67-2 respectively. As a result, add resistance does not change. As described herein above, by prescribing the direction of the pinned layer magnetization of the first element and of the pinned layer magnetization of the second element in antiparallel each other, the spin valve element structure is rendered sensitive so that the resistance is changed only when fields of different opposite polarity are applied to two elements.

When a field gradient is applied between two spin valve elements, a situation is formed, and this situation is the same as that described herein above, namely, the situation formed when different external fields are applied to two elements. The difference causes a change in add resistance of two elements based on the reason described herein above. The change is detected as the change in current or voltage, that is obvious from the above-mentioned reason.

This example is featured by antiparallel (about 180 degrees) magnetization direction of the pinned layers 44 and 49 as shown in FIG. 1D.

Alternatively to specify the magnetization direction of these pinned layers, a method in which exchange coupling between a high coercive force film such as α-Fe$_2$O$_3$ film or CoPt film and ferromagnetic film is used is known. In this case, high coercive force films are deposited instead of the antiferromagnetic films 45 and 50 (piled up at the same position).

In the present invention, because two spin valve elements are piled up, elements having a difference in corrosive force between these elements of 100 Oe or larger are used. Because of the difference in coercive force, the magnetization direction can be prescribed by reducing successively magnetization field. Thereby, the magnetization direction of a pinned layer is prescribed arbitrarily (in the present invention, in antiparallel). The larger the difference in coercive force is, the easier the magnetization is, however, the difference of 100 Oe or higher is sufficient for practical application. It is well known that the difference in coercive force is controlled by controlling material, film composition, deposition temperature, and deposition velocity. The above-mentioned operations are utilized to prescribe the magnetization direction of pinned layera to be in antiparallel, and applied to the present invention.

Figure 3:
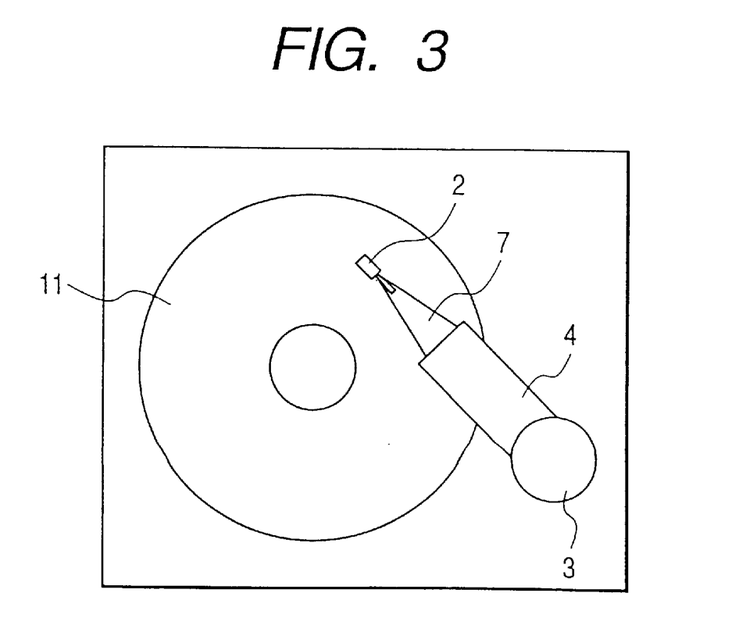
FIG. 3 is a plan view of a magnetic recording apparatus provided with a reproducing means to which the present invention is applied as a reproducing component of a magnetic head.

A field gradient detection means comprising two functional thin films (spin valve elements 33 and 34) shown in the FIG. 1D is incorporated in a magnetic head slider 2 which is similar to a conventional magnetic head slider as shown in FIG. 3. The magnetic head slider 2 is provided with a recording means according to a prescribed manner. A perpendicular magnetic recording medium having the axis of easy magnetization in the perpendicular direction to the film plane is used as the recording medium 11. The magnetic head slider 2 is supported by a suspension 7 and arm 4. A rotary actuator 3 is used for positioning the magnetic head slider 2 and recording medium. Other components such as a motor for rotating the recording medium, a circuit board for processing electric signals, and an electric circuit for controlling the whole apparatus are used to complete the recording apparatus though they are not shown in the drawing.

By applying the field gradient sensing system which is the main component of the reproducing apparatus of this invention, the output signal is rendered Gaussian shaped regardless of using a perpendicular medium as a recording medium. Hence, the same signal processing circuit as used in a reproducing apparatus which uses a conventional recording medium having a longitudinal magnetization film can be used. The signal processing circuit is featured in that the circuit scale is small because of reduced number of signal detection points and the circuit is excellent in high speed capacity. Therefore, the increased recording density does not cause any process time loss for processing signals.

The above-mentioned effect is obtained only by the present invention and is realized by applying the field gradient detection means provided with piled up two functional thin films (spin valve elements 33 and 34) shown in FIG. 1D to the reproducing means for reproducing magnetic information generated from a perpendicular magnetization film.

To describe more clearly this point, the present invention is described with reference to FIG. 7A and FIG. 7B.

Figure 7A:
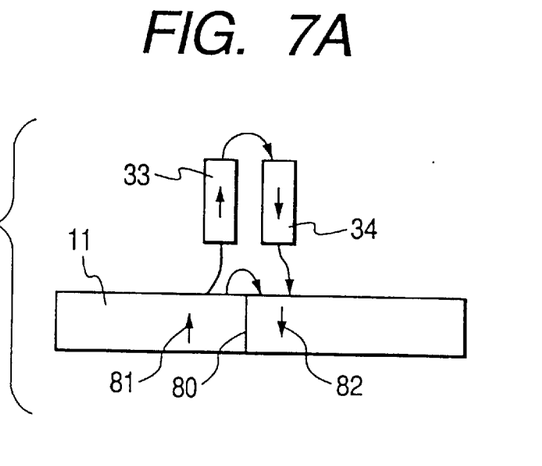
FIG. 7A and FIG. 7B are diagrams for describing operational principle of a reproducing means of one example of the present invention.

FIG. 7A is a sectional view (cross section in the plane parallel to the line β in FIG. 1A) of a field gradient detection means provided with two functional thin films 33 and 34 and a perpendicular magnetization film. In the perpendicular magnetization film 11, the magnetic state turns from an upward magnetic state 81 to a downward magnetic state 82 at the position where information "1" is located, and the information is detected based on the existence of a transition 80.

It is assumed that the first functional thin film 33 and the second functional thin film 34 are positioned just above the transition 80 of the medium. Magnetic fluxes are generated from each domain in the arrow direction shown in the drawing, and these magnetic fluxes penetrate into two functional thin films (in detail, soft magnetic layers which are components of spin valve elements).

Because of antiparallel magnetization state on the right vs. left side separated at the boundary of transition 80, two fields which act on two functional thin film are antiparallel. In other words, a difference of the field is caused between two functional thin films. The difference causes a change in add resistance of two functional thin films because of the reason described herein above, and the change is detected as an electric signal. Angular directional turning of the magnetizations 81 and 82 results in directional turning of magnetic flux which acts on two functional thin films. This turning causes resistance change in reverse to the above-mentioned manner (increase or decrease).

Figure 7B:
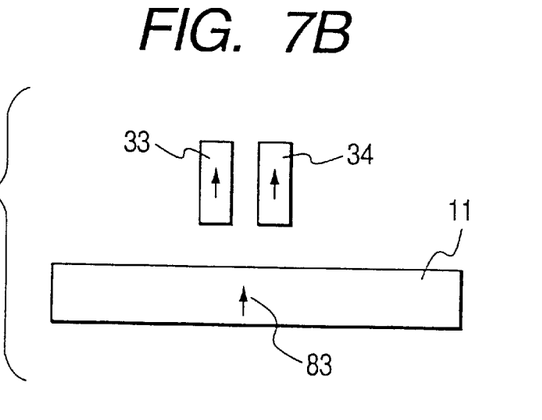

However, on a place where there is no transition just under the first functional thin film 34 and the second functional thin film 33 as shown in FIG. 7B, equal and weak magnetic fluxes (stray field decreases due to demagnetization from domain itself) penetrate to two functional thin films, no electric signal is therefore generated.

As described herein above, only when a difference of the field from a magnetic recording medium namely field gradient is given, electric resistance of two functional thin films changes. Because the change is differently incremental resistance or decremental resistance depending on the magnetic state of polarity of transition, Lorentzian pulse electric signal is obtained. Based on this feature, it is possible to process signals using the same signal processing as used conventionally (longitudinal magnetization film) regardless of using of a perpendicular magnetization film.

The above-mentioned example involves the generally used structure of a spin valve element. However, the present invention is also realized by using other spin valve element structure.

SECOND EXAMPLE

Figure 4A:
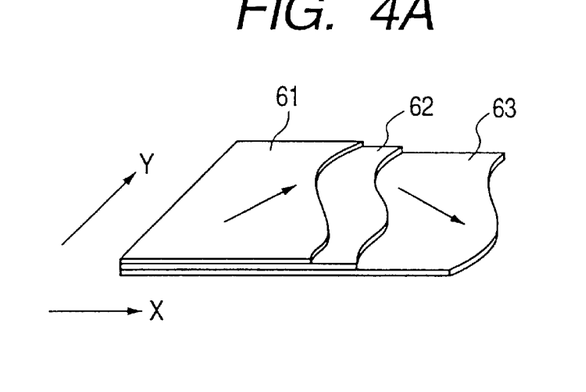
FIGS. 4A and 4B are diagrams for describing the principle of the head using dual MR as a reproducing means.
Figure 4B:
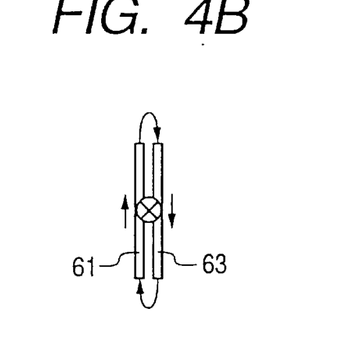

Dual MR head described in THEORY OF MAGNETIC RECORDING by H. NEAL BERTRAM on pages from 194 to 199 has been known as another structure for detecting magnetic gradient generated by perpendicular field. In this structure, as shown in FIG. 4A and FIG. 4B, two magnetoresistive elements 61 and 63 are piled up with interposition of an insulator layer or a high resistance film 62, the fields generated by the current magnetize the magnetoresistive elements asymmetrically. The asymmetrical magnetization is determined by current intensity, element width, and distance between magnetoresistive elements, and easily estimated based on the soft adjustment layer (SAL) magnetoresistive sensor theory.

Though the above-mentioned structure is very simple, the structure is disadvantageous in that sensitivity is low because the functional thin film functions based on magnetoresistive effect. Therefore, in the recording density range exceeding 10 Gb/in$^2$ where the perpendicular magnetization film is required, the reproducing output is insufficient. Though magnetization asymmetry causes no problem of symmetry property of amplitude (no difference between plus signal and minus signal), the magnetization asymmetry causes the change in symmetry of pulse on the time axis. This phenomenon is not described in the above-mentioned disclosed art. This problem of symmetry of pulse on the time axis is due to the property of magnetoresistive element that the sensitivity of two magnetoresistive elements change reversely (high and low) depending on the magnetization asymmetry. This phenomenon results in reproduction of a pulse having a wide skirt when magnetic information is positioned on the side of magnetoresistive element of higher sensitivity, and on the other hand, results in reproduction of a pulse having a narrow skirt when magnetic information is positioned reversely.

The interference between neighboring signals becomes remarkable with increasing high density recording. When, if a signal has nonlinear distortion, following signal processing can not be performed. To avoid this trouble, two magnetoresistive elements having the same sensitivity may be used, however, because of inevitable some allowance of sensitivity in manufacturing and accuracy of supplied current (including control of external factors such as temperature), such factors cause the problem.

Because spin valve elements are used in the present invention, the present invention is applied to dual MR head without any problem. Because magnetization of a pinned layer is prescribed in one direction by a antiferromagnetic film in the spin valve structure, the problem of asymmetry is not involved. Such excellent structure can not be derived from the above-mentioned conventional art.

THIRD EXAMPLE

Figure 5A:
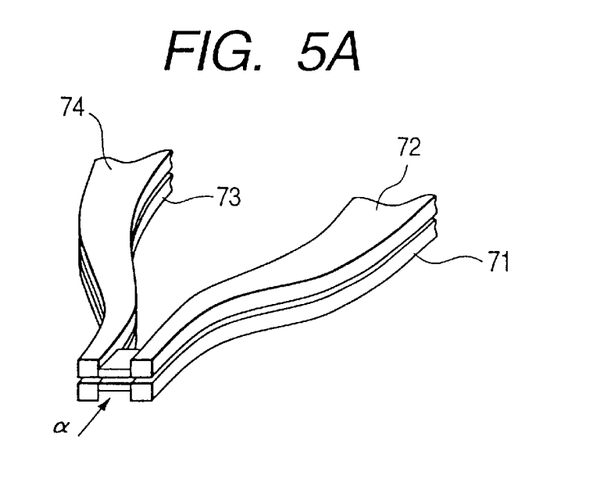
FIG. 5A is a perspective view for illustrating the structure of a reproducing means of the second example of the present invention.

Another example for realizing excellent reproducing function from a perpendicular magnetization film using two spin valve elements is described hereinafter. In this example, the first spin valve element 34 and the second spin valve element 33 are maintained in electric insulated condition. As shown in FIG. 5A, electrodes 71 and 73 and 72 and 74 are connected to the respective spin valve elements. These two pairs of electrodes are electrically insulated.

Figure 5B:
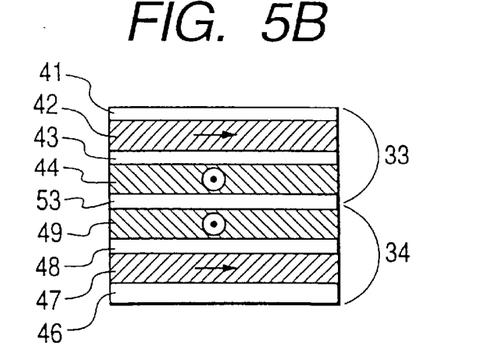
FIG. 5B is a sectional view for illustrating piling up of piled up two spin valve elements 33 and 34 in FIG. 5A.

To maintain two spin valve elements in electrically insulated condition, an antiferromagnetic oxide film 52 is inserted between two spin valve elements 33 and 34 as shown in the cross sectional structure of FIG. 5B. NiFe alloy films 44 and 49 are deposited on the top and bottom surface of the antiferromagnetic oxide film 52, which is served as a pinned layer. On the outside surface, Cu medium layers with a thickness of 3 nm (non-magnetic layer) 43 and 48, and further NiFe alloy films with a thickness of 3 nm 42 and 47 are deposited. The NiFe alloy films 42 and 47 are soft magnetic films and served as a free layer of a spin valve element. To improve the function as a free layer, Hf films 41 and 46 are deposited additionally on the outside surface. The Hf film is served also as a protection film.

As described herein above, each electrode may be insulated with an antiferromagnetic oxide film 52 to maintain the first spin valve element and the second spin valve element in electrically insulated condition. In detail, antiferromagnetic oxide films 52 are provided between the electrodes 71 and 72 and between the electrodes 73 and 74 to electrically insulate. In this case, the process is simplified. By the way, in the above-mentioned structure, because the magnetization of pinned layers 44 and 49 are specified by free layers 42 and 47 consisting of common material (NiFe alloy film), it is impossible to prescribe the magnetization direction of the first spin valve element 34 and the second spin valve element 33 in antiparallel. To prevent the problem, the electrodes are insulated.

Figure 5C:
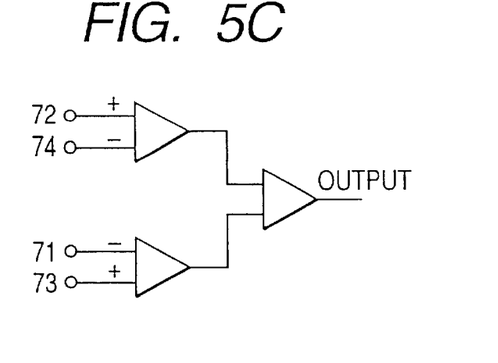
FIG. 5C is a diagram of a circuit for processing signal outputted from piled up two spin valve elements 33 and 34 in FIG. 5A.

Using such structure, it is possible to reproduce recorded information from a perpendicular magnetization film by applying so-called differential operation, in which output electrodes 72 and 74 and output electrodes 71 and 73 are connected to amplifier circuits of different polarity as shown in the circuit diagram of FIG. 5C and respective outputs are synthesized. Output is obtained finally only when outputs of different polarity are detected from two spin valve elements, this fact explains the reason. This state is equivalent to the state shown in FIG. 7A and FIG. 7B, and based on this reason, it is possible to reproduce recorded information from a perpendicular magnetization film.

This example is featured in that the effect of thermal fluctuation is removed by differential operation circuit because thermal fluctuation affects the respective elements commonly if it occurs. The feature allows this method to be applied to contact recording which is likely to be involved in disturbance though the number of electrodes increases.

Reproducing function is realized by a method in which any one of the above-mentioned reproducing means is provided to a magnetic head slider, and a part of which is provided at least on the air bearing surface near the perpendicular magnetization recording medium surface.

Figure 8:
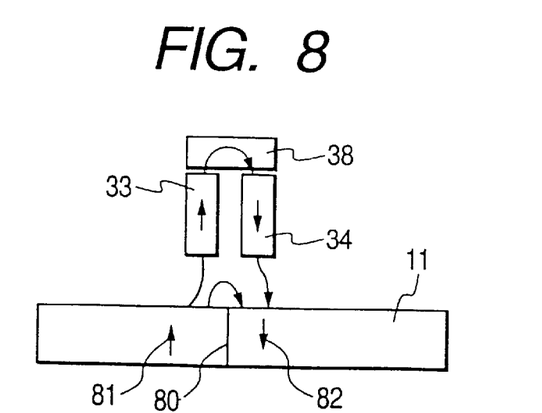
FIG. 8 is a diagram for describing operational principle of a reproducing means of another example of the present invention.

When, as shown in FIG. 8, the soft magnetic pattern 38 is provided on a place near the first and second spin valve elements 33 and 34 and distant from the air bearing surface. By providing the soft magnetic pattern, a magnetic circuit is formed between the spin valve element 33 and the spin valve element 34. The magnetic circuit is effective for inducing efficiently the magnetic flux from the magnetization 81 and magnetization 82 in the recording medium 11. If there is no magnetic pattern, the magnetic flux flows mostly from the side where two spin valve elements are located in parallel each other to the neighboring element. However, if a magnetic circuit is formed on the side which is distant from the medium surface, the magnetic flux flows toward the magnetic circuit. As a result, the magnetic flux flows into more area of the elements, and the output is obtained efficiently.

FOURTH EXAMPLE

In this example, to detect the field intensity difference at the position distant spatially, two giant magnetoresistive elements having the structure as described herein under are piled up. The example is described with reference to a sectional view of FIG. 9.

Figure 9:
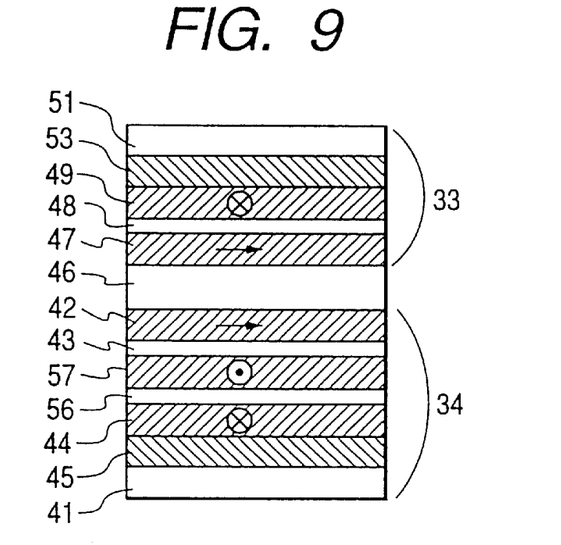
FIG. 9 is a sectional view of a spin valve element which is a component of the reproducing component of another example of the present invention.

First, a primary film (Hf: 5 nm) 41 is piled on a substrate, and an antiferromagnetic film (Fe—Mn: 10 nm) 45, and a magnetic film (first ferromagnetic film: NiFe alloy: 6 nm) 44 are piled up successively, thereafter an Ru film 56 having a thickness of 0.7 nm is deposited, and further a magnetic film (second ferromagnetic film: NiFe alloy film: 3 nm) 57 is deposited.

On the film 57, a non-magnetic film (Cu: 3 nm) 43 is deposited, and then a soft magnetic film (third ferromagnetic film: NiFe alloy film: 6 nm) 42 which functions as a free layer is deposited. These successively deposited films constitute a first spin valve element (a giant magnetoresistive element or functional thin film in a broader sense of the term) 34.

Next, for forming a second spin valve element 33, a soft magnetic film (fourth ferromagnetic film: NiFe alloy film: 6 nm) 47 which functions as a free layer is deposited on a spacer layer 46, and on it a non-magnetic film (Cu: 3 nm) 48, and a magnetic film (fifth ferromagnetic film: NiFe alloy film: 3 nm) 49 which function as a pinned layer is deposited. On it an antiferromagnetic film (Fe-Mn: 10 nm) 53 and a protection layer (Hf: 5 nm) 51 are deposited.

This example is featured in that after deposition of the magnetic film (first ferromagnetic film: NiFe alloy film: 6 nm) 44, the Ru film 56 with a thickness of 0.7 nm is deposited, and the magnetic film (second ferromagnetic film: NiFe alloy film: 3 nm) 57 is deposited. This structure is described in Digests of INTERMAG '96 AA-04 by V. S. Speriosu et. al. In this literature, it is described that the magnetization direction of ferromagnetic films between which the Ru film is sandwiched is antiparallel, the magnetization direction of the ferromagnetic film having a thicker thickness (to say precisely, higher product of saturation magnetization and film thickness) is coincident with the external field. This structure is featured in that the coercive force of the total magnetic films between which the Ru film is sandwiched is increased, and the magnetostatic effect on the external is reduced. Application of this structure to a free layer or a pinned layer of a spin valve element is suggested based on these features.

In this example, this structure is applied to a pinned layer, but the purpose of the present invention is different from that described in the above-mentioned literature. In detail, in this example, two elements are provided at the positions distant spatially each other to measure field intensity simultaneously, and the difference in the field intensity is detected as an output difference to measure the field gradient. To realize this mechanism, in this example, an element structure in which the magnetization direction of pinned layers of piled up two spin valve elements is antiparallel is disclosed. Further, to realize this structure, the example described the structure in which the property of an Ru film is utilized. To clarify the novelty, it is important to understand the requirement of antiparallel magnetization of pinned layers, this point was described in detail in the description of the first example with reference to FIG. 6A and FIG. 6C.

Figure 10A:
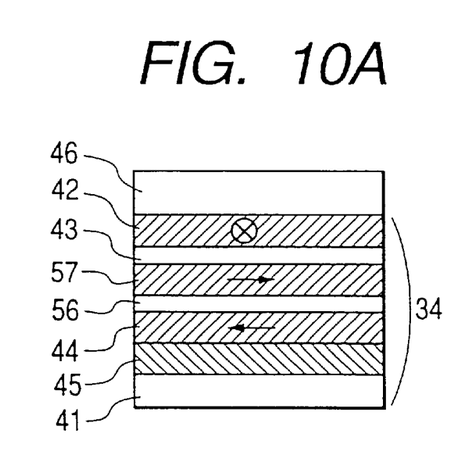
FIG. 10A and FIG. 10B are diagrams for describing magnetization of two spin valve elements 33 and 34.
Figure 10B:
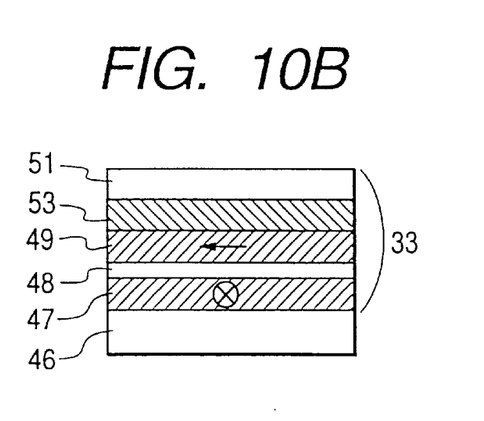

FIG. 10A and FIG. 10B are sectional views for describing the magnetization direction of the magnetic film which is required to realize the present invention. The magnetization direction of the magnetic film (first ferromagnetic film) 44 of the first spin valve element 34 shown in FIG. 10A is regarded as a reference, and the magnetization direction is assumed to be left facing to the paper plane, then it is required that the magnetization direction of the second ferromagnetic film 57 is right. The magnetization direction of the magnetic film (fifth ferromagnetic film) 49 of the second spin valve element 33 shown in FIG. 10B is required to be left. The soft magnetic films 42 and 47 which function as a free layer have an inclination of 90 degrees with respect to the pinned layer magnetization (it is realized by magnetizing the permanent magnet 35 shown in FIG. 1B and FIG. 1C) so that the magnetization direction both turns in the same direction when an external field is applied.

Figure 11A:
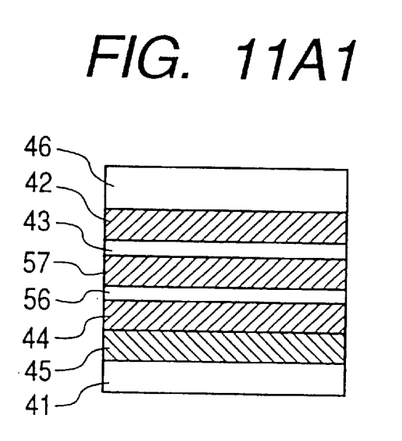

The magnetization structure of the above-mentioned magnetic film (pinned layer) is realized by magnetization processing shown respectively in FIG. 11A1, FIG. 11A2, FIG. 11B1, and FIG. 11B2. FIG. 11A1 shows the structure after film forming of the first spin valve element 34. In this structure, the magnetization direction of respective magnetic films is not yet prescribed. As shown in FIG. 11A2, heat treatment is carried out at a temperature around the blocking temperature of the antiferromagnetic film 45 under application of an external field 61.

Figure 11A:
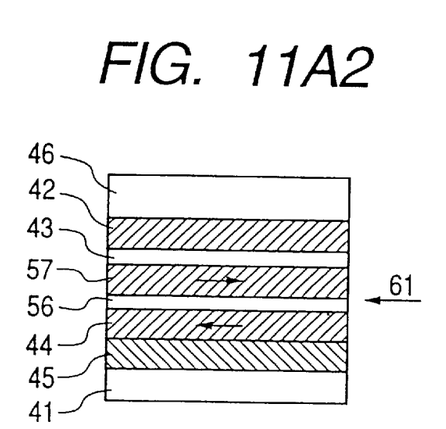

Because magnetization of the first ferromagnetic layer 44 and the second ferromagnetic layer 57 is coupled strongly in antiparallel, both layers 44 and 57 behave together as one magnetic film layer under a normal condition. The ferromagnetic layer having the higher product of the film thickness and saturation magnetization is predominant to the external field 61 out of two ferromagnetic layers, and the magnetization direction of the predominant ferromagnetic layer is parallel to the external field 61. As a result, the magnetization direction of the layer having the lower product of the film thickness and saturation magnetization is directed opposite to the external field 61. In this example, the magnetization of the first ferromagnetic layer 44 is directed in the direction of the external field 61 and the magnetization of the second ferromagnetic layer 57 is directed in the direction opposite to the external field 61. The magnetization of the first magnetic film 44 is fixed in the direction of the external field 61 due to exchange coupling on the interface of the antiferromagnetic layer 45. This principle is the same as involved in the conventional spin valve element.

In this example, because the magnetic film 44 is in contact with the Ru 56 which causes antiferromagnetic coupling in extremely thin film condition, the magnetization direction of the second magnetic film 57 which is in contact with the reverse interface is antiparallel with respect to the external field 61. This phenomenon is described in the above-mentioned literature.

Figure 11B:
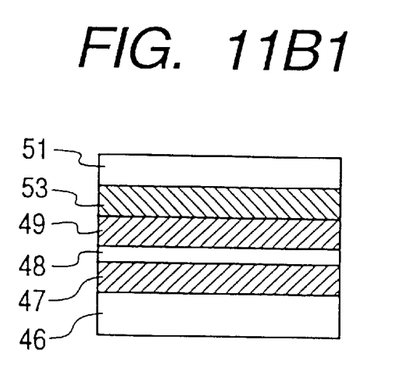
Figure 11B:
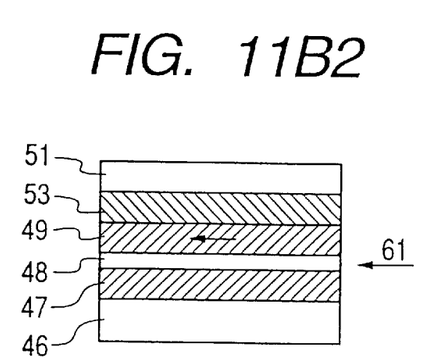

Similarly, application of the external field 61 to the structure after film forming of the second spin valve element 33 shown in FIG. 11B1 results in the state shown in FIG. 11B2. This state is easily understandable from the fact that the magnetization of the fifth magnetic film 49 is fixed in the direction of the external field 61 due to the effect of exchange coupling from the antiferromagnetic layer 53.

In the structure shown in FIG. 11A2 and FIG. 11B2, the spacer 46 is used commonly, on both sides of the spacer 46 the third magnetic film 42 and fourth magnetic film 47 which function as a free layer are located. These magnetic films can be turned freely by an external field as described hereinbefore. These magnetic films are located on the magnetic film 57 (second magnetic film) and the magnetic film 49 (fifth magnetic film) which function as a pinned layer with interposition of the Cu films 43 and 48. Because the magnetization direction of the magnetic film 57 (second magnetic film) and the magnetic film 49 (fifth magnetic film) is antiparallel each other based on the above-mentioned principle, the first spin valve element 34 and the second spin valve element 33 perform differential function.

For structuring the above-mentioned magnetization structure, emphasis is placed on making the film thickness of the second magnetic film 57 thin relatively to the film thickness of the first magnetic film 44. By structuring the magnetic films as described herein above, the magnetization direction of the first magnetic film 44 is directed preferentially in parallel to the external field direction 61 (in the macro view point, magnetized so that magnetostatic energy is reduced), and the magnetization direction of the second magnetic film 57 located on the side in contact with the free layer 42 is directed in antiparallel to the external field direction 61. The principle described herein above can be estimated easily from the above-mentioned literature, but there is a problem in application of this principle to the dual type element structure of the present invention. In detail, the coercive force of the pinned layer comprising the first magnetic film 44, Ru film 56, and second magnetic film 57 is insufficient.

Inventors of the present invention are aware of a knowledge from experiments that equalization of fixing force of the pinned layer magnetization of two elements is essential to secure symmetry of the output for using the dual type element structure.

For the purpose of secure symmetry, in the present invention, the magnetization direction of the first magnetic film 44 and the fifth magnetic film 49 are fixed by the antiferromagnetic films 45 and 53. The difference of output between the first spin valve element and the second spin-valve element is eliminated. This novel art is not disclosed in the above-mentioned known example, it is said that this art is a novel art peculiar to the dual type element of the present invention.

This problem is solved also by using a ferromagnetic film consisting of high coercive force material such as Co—Pt instead of the antiferromagnetic films 45 and 53. In this case, the magnetization direction of the ferromagnetic film (equivalent to 45 and 53) is prescribed to be in parallel (equal) to the external field by performing magnetization processing as shown in FIG. 11A1, FIG. 11A2, FIG. 11B1, and FIG. 11B2. Also in this case, the magnetization of the ferromagnetic film and the pinned layer is exchange-coupled, and the magnetization direction is prescribed. Therefore, the desired spin valve element structure is structured like the above-mentioned structure. By providing an Ru film in the spin valve element, the magnetization direction of the pinned layer which is in contact with the non-magnetic Cu film is prescribed to be in antiparallel to the magnetization field. Thereby, the same function as that of the above-mentioned example can be realized.

In the above-mentioned example, a NiFe alloy film is used as the magnetic films 44 and 57, however alternatively a Co ally film which is a magnetic film may be used for the present invention without any problem. Similarly, Ta or oxide may be used for the protection film 51 instead of Hf film without any problem in application of the present invention.

Further, to enhance the function of the first and second spin valve elements, an extremely thin film of Co r NiFe may be provided on the interface facing to the Cu layer or Ru layer, this method is applied to the present invention without any problem. Therefore it is obvious that these examples are included in the present invention.

The case that Ru is used for the first non-magnetic layer 56 is described in the above-mentioned examples, however alternatively, any one metal selected from a group including Ir, Rh, Cr, and Cu or any one alloy containing two or more alloy materials which results in strong antiferromagnetic layer coupling may be used instead of Ru, and it is confirmed that these materials give the same effect as Ru.

A field gradient detection means comprising two functional thin films described hereinbefore is incorporated into a conventional magnetic head slider 2 shown in FIG. 3. In the magnetic head slider 2, a recording means is provided in the usual manner. A perpendicular magnetic recording medium having an axis of easy magnetization in perpendicular direction to the film plane is used as the recording medium 11. The magnetic head slider 2 is supported by the suspension member 7 and arm 4. The magnetic head slider 2 and the recording medium are positioned by the rotary actuator 3. A recording apparatus of the present invention is completed using other components such as a motor for rotating the recording medium, circuit board for processing electric signal, and electric circuit for controlling the whole apparatus, which are not shown in the drawings. By applying the field gradient detection means which is the main component of the present invention, reproducing signal of Gaussian shape is obtained regardless of using a perpendicular magnetic film medium as a recording medium. As a result, the same signal processing circuit as used for signal processing of a longitudinal magnetization film recording medium is used successfully.

This signal processing circuit has a small number of signal detection points and is a circuit of a small scale, and excellent in high speed performance. Signal processing causes no processing time loss regardless of increased recording density.

Figure 12A:
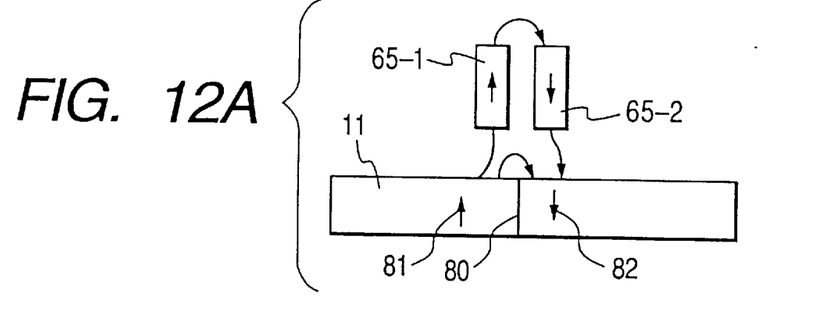
FIG. 12A and FIG. 12B are diagrams for describing operational principle of a reproducing component of the present invention.

The above-mentioned effect can be obtained only by the present invention, and the effect is realized by applying the field gradient detection means comprising piled up two functional thin films to a means for reproducing magnetic information generated from a perpendicular magnetic film. To clarify this point, the example is described in detail with reference to FIG. 12A and FIG. 12B. FIG. 12A shows a sectional view (sectional view along the plane parallel to the line β in FIG. 1) of the field gradient detection means comprising piled up two functional thin films and the perpendicular magnetic film. In the perpendicular magnetic film 11, the magnetization condition changes from upward magnetization 81 to downward magnetization 82 at the position where the information "1" is located. Therefore information is read out based on the existence of the transition 80.

It is assumed that the first functional thin film 65-1 (equivalent to the first spin valve element 34) and the second functional thin film 65-2 (equivalent to the second spin valve element 33) are positioned just above the transition 80 on the perpendicular magnetization film, a magnetic flux is generated in the direction as described in the drawing from each domain, and the magnetic flux penetrates into two functional thin films (in detail, the soft magnetic layer which is a component of a spin valve element). Because the right and left magnetization states are different and antiparallel with respect to the border of the transition 80, fields acting on two functional thin films are antiparallel each other. It is understandable that field difference is generated between two functional thin films. As a result, add resistance of two functional thin films changes based on the reason described herein above, and the change is detected as an electric signal. When the direction of the magnetization 81 and 82 is reversed, then the direction of the magnetic flux is also reversed. As a result, resistance change opposite to the above-mentioned case occurs (increase or decrease of the resistance).

However, on a place where there is no transition just under the first functional thin film 65-1 and the second functional thin film 65-2 as shown in FIG. 12, an equal and weak magnetic flux (stray field decreases due to demagnetization from domain itself) penetrates into two functional thin films, and no electric signal is generated.

Figure 12B:
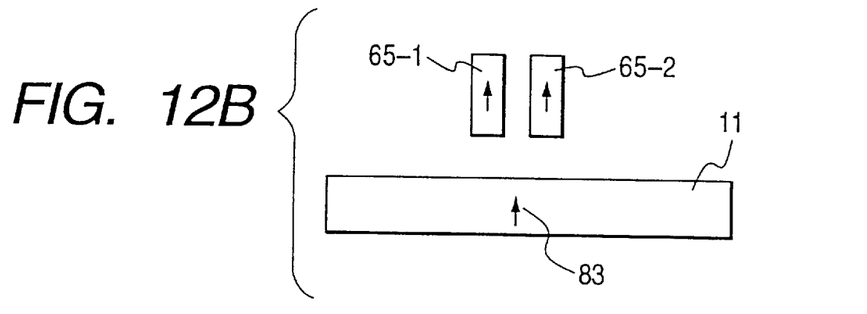

As described herein above, the resistance changes only when the field difference from a medium between two functional thin films namely the field gradient is caused. Because the change results in resistance increment or resistance decrement depending on the magnetization state of a transition position, Lorentzian pulse electric signal is obtained. Based on this feature, the same signal processing as used for a conventional longitudinal magnetization film is used successfully regardless of using a perpendicular magnetization film.

FIFTH EXAMPLE

The above-mentioned examples provided with generally used spin valve elements are described. However, other spin valve element structures may be applied to realize the present invention. For example, an element having a pinned layer of the second spin valve element 33 shown in FIG. 13 comprising the fifth magnetic film 49, the Ru film 54, and the sixth magnetic film 55 with the magnetization direction fixed by the antiferromagnetic film 53 is included in the scope of the present invention. In this example, other basic element structure, magnetization structure, and electrode structure is the same as the above-mentioned examples. In this example, the structure of the pinned layer is the same as that of the first spin valve element. Therefore the output of the first spin valve element 34 and the second spin valve element 33 is completely symmetrical, and excellent reproducing processing is performed.

Figure 13:
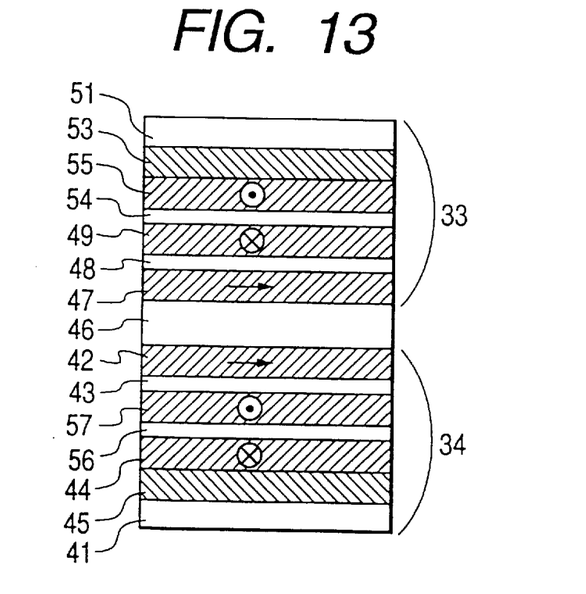
FIG. 13 is a sectional view for illustrating a reproducing means comprising a piled up two spin valve elements of another example of the present invention.

To apply the spin valve element which uses the two Ru films 54 and 56 to the present invention, it is required that the magnetization direction of the second magnetic film 57 and the magnetization direction of the fifth magnetic film 49 are antiparallel each other. To realize the antiparallel magnetization direction by applying an external field, it is required that the product of the film thickness and saturation magnetization of the first magnetic film 44 which is in contact with the antiferromagnetic film 45 is larger than the product of the film thickness and saturation magnetization of the second magnetic film 57, and also the product of the film thickness and saturation magnetization of the sixth magnetic film 55 which is in contact with the antiferromagnetic film 53 is smaller than the product of the film thickness and saturation magnetization of the fifth magnetic film.

A hard magnetic film (ferrimagnetism, forromagnetism) which has the same magnetization direction as that of an external field is used at the same position instead of the antiferromagnetic film 53 without any problem. Elimination of the ferromagnetic film does not cause any problem to realize the present invention. Though this example is a special case, this example also involves the same principle to solve the problem on which the present invention addresses, therefore this example should be included in the scope of the present invention.

Any one of the above-mentioned reproducing means is provided in a magnetic head slider, and a portion of the reproducing means is located on the air bearing surface at least near a perpendicular magnetic recording medium surface, and thus reproducing function is realized.

According to the present invention described hereinbefore, reproducing signal is Gaussian shaped regardless of using a perpendicular magnetic film as a recording medium. Based on this effect, the same signal processing circuit as used for reproducing a longitudinal magnetization film recording medium is used successfully. Because such signal processing circuit has the small number of signal detection points, the circuit scale is small, and the signal processing circuit is excellent in high speed performance. As a result, there is no processing time loss in signal processing regardless of increased recording density.

The above-mentioned effect can be obtained only by the present invention, and realized by applying a detection means comprising piled up two spin valve elements to a reproducing means of magnetic information obtained from a perpendicular magnetization film. Based on the effect described herein above, a high density storage apparatus having a recording density of 10 Gb/in$^2$ or more using a perpendicular magnetization film is realized.

The reproducing head of this invention is effective also for densification of longitudinal magnetization film recording. The reason is described herein under. In the improvement of linear density of a longitudinal magnetization film, the reproducing resolution is specified by the distance of the shield in the case of a conventional magnetoresistive reproducing head and spin valve head. In other words, it is required that the distance of the shield is narrow for high liner density. However, it is very difficult for narrow distance of the shield that the multi-layered complex structure such as a spin valve is located between shields and the electric insulation between the shield and the spin valve is maintained consistently. On the other hand, because a simple spacer layer specifies the resolution and electric insulation is not required in the method of the present invention, the high linear density is realized easily.

What is claimed is:

1. A magnetic head comprising:
   a first spin valve element;
   a second spin valve element; and
   a non-magnetic spacer layer formed between the first spin valve element and the second spin valve element;
   the first spin valve element including:
   a first pinning layering, including,
   a first antiferromagnetic film;
   a first ferromagnetic film;
   a first non-magnetic film;
   a second ferromagnetic film;
   a second non-magnetic film; and
   a first soft magnetic film forming a first free layer;
   the second spin valve element including:
   a second pinning layer including,
   a second antiferromagnetic film;
   a third ferromagnetic film;
   a third non-magnetic film; and
   a second soft magnetic film forming a second free layer;
   wherein:
   the magnetization direction of the first ferromagnetic film and the magnetization direction of the second ferromagnetic film are in an antiparallel state;
   the magnetization direction of the second ferromagnetic film and the magnetization direction of the third ferromagnetic film are in an antiparallel state; and
   the first soft magnetic film and the second soft magnetic film are arranged to be symmetrical with respect to the non-magnetic spacer layer.

2. A magnetic head according to claim 1, wherein said first non-magnetic film consists of any one of metal layers selected from a group of Ru, Rh, Ir, Cr, and Cu or consists of an alloy containing some of these metals.

3. A magnetic head according to claim 1, wherein said second non-magnetic film and said third non-magnetic film comprise a Cu layer.

4. A magnetic head according to claim 1, wherein the product of the film thickness and saturation magnetization of said first ferromagnetic film is larger than the product of the film thickness and saturation magnetization of said second ferromagnetic film.

5. A magnetic head according to claim 1, wherein the magnetization direction of said first ferromagnetic film and said third ferromagnetic film is prescribed to be in the same direction.

6. A magnetic head according to claim 1, wherein the magnetization direction of said first ferromagnetic film and said third ferromagnetic film is prescribed by antiferromagnetic films or hard magnetic films which are respectively in contact with both said first ferromagnetic film and said third ferromagnetic film.

7. A magnetic head according to claim 1 in which a film thickness of the second ferromagnetic film is smaller than a film thickness of the first ferromagnetic film.

8. A magnetic head comprising:
   a first spin valve element;
   a second spin valve element; and
   a non-magnetic spacer layer formed between the first spin valve element and the second spin valve element;
   the first spin valve element including:
   a first pinning layer including,
   a first antiferromagnetic film;
   a first ferromagnetic film;
   a first non-magnetic film made of Ru;
   a second ferromagnetic film;
   a second non-magnetic film; and
   a first soft magnetic film forming a first free layer;
   the second spin valve element including:
   a second pinning layer including,
   a second antiferromagnetic film;
   a third ferromagnetic film;
   a third non-magnetic film; and
   a second soft magnetic film forming a second free layer;
   wherein:
   the magnetization direction of the second ferromagnetic film and the magnetization direction of the third ferromagnetic film are in an antiparallel state; and
   the first soft magnetic film and the second soft magnetic film are arranged to be symmetrical with respect to the non-magnetic spacer layer.

9. A magnetic head according to claim 8, wherein said first non-magnetic film consists of any one of metal layers selected from a group of Ru, Rh, Ir, Cr, and Cu or consists of an alloy containing some of these metals.

10. A magnetic head according to claim 8, wherein said second non-magnetic film and said third non-magnetic film comprise a Cu layer.

11. A magnetic head according to claim 8, wherein the product of the film thickness and saturation magnetization of said first ferromagnetic film is larger than the product of the film thickness and saturation magnetization of said second ferromagnetic film.

12. A magnetic head according to claim 8, wherein the magnetization direction of said first ferromagnetic film and said third ferromagnetic film is prescribed to be in the same direction.

13. A magnetic head according to claim 8, wherein the magnetization direction of said first ferromagnetic film and said third ferromagnetic film is prescribed by antiferromagnetic films or hard magnetic films which are respectively in contact with both said first ferromagnetic film and said third ferromagnetic film.

14. A magnetic head according to claim 8 in which a film thickness of the second ferromagnetic film is smaller than a film thickness of the first ferromagnetic film.

* * * * *

UNITED STATES PATENT AND TRADEMARK OFFICE
CERTIFICATE OF CORRECTION

PATENT NO. : 6,392,849 B2
DATED : May 21, 2002
INVENTOR(S) : Yoji Maruyama et al.

It is certified that error appears in the above-identified patent and that said Letters Patent is hereby corrected as shown below:

Column 10,
Line 20, change "layera" to -- layers --.

Column 18,
Line 26, change "forromagnetism" to -- ferromagnetism --.

Signed and Sealed this

Twenty-fifth Day of February, 2003

JAMES E. ROGAN
*Director of the United States Patent and Trademark Office*